United States Patent [19]
Schifko et al.

[11] Patent Number: 5,721,412
[45] Date of Patent: Feb. 24, 1998

[54] DISCONNECTOR FOR A METAL ENCAPSULATED, GAS INSULATED HIGH VOLTAGE SWITCHGEAR

[75] Inventors: Herbert Schifko, Glattbrugg; Sven Forss, Bern; Jadran Kostovic, Neuenhof; Piero Tecchio, Oberrohrdorf, all of Switzerland

[73] Assignee: Asea Brown Boveri AG, Baden, Switzerland

[21] Appl. No.: 597,030

[22] Filed: Feb. 5, 1996

[30] Foreign Application Priority Data

May 26, 1995 [DE] Germany ............... 195 19 301.6

[51] Int. Cl.⁶ .................... H01H 33/53; H01H 33/64
[52] U.S. Cl. ................ 218/43; 218/45; 218/67; 218/80
[58] Field of Search ............ 218/43–88; 361/604–621

[56] References Cited

U.S. PATENT DOCUMENTS

| | | | |
|---|---|---|---|
| 3,740,508 | 6/1973 | Olsen et al. | 218/67 |
| 4,389,553 | 6/1983 | Konig et al. | 218/86 |
| 4,678,876 | 7/1987 | Westbrock et al. | 218/44 |
| 5,483,031 | 1/1996 | Matsuda | 218/48 |
| 5,484,972 | 1/1996 | Tecchio | 218/70 |
| 5,578,804 | 11/1996 | Berger et al. | 218/43 |
| 5,625,179 | 4/1997 | Bleiker et al. | 218/80 |

FOREIGN PATENT DOCUMENTS

| | | | |
|---|---|---|---|
| 0012708B1 | 6/1980 | European Pat. Off. | H02B 13/02 |
| 2346884 | 10/1977 | France | H02B 13/02 |
| 2210626 | 9/1973 | Germany | H02B 13/02 |
| 3109669A1 | 11/1982 | Germany | H02B 13/02 |
| 4210545A1 | 10/1993 | Germany | H01H 33/24 |
| 4320906A1 | 12/1994 | Germany | H01H 33/53 |
| 4336951A1 | 5/1995 | Germany | H02B 5/06 |

*Primary Examiner*—J. R. Scott
*Attorney, Agent, or Firm*—Burns, Doane, Swecker & Mathis, L.L.P.

[57] ABSTRACT

A disconnector for a metal encapsulated, gas insulated high voltage switchgear includes a housing with at least a first and a second axis which intersect at a first angle. The disconnector also includes two contact carriers that are arranged on the first axis and are positioned between to contact carriers at an isolating distance by securing elements. The first axis and the second axis each form an axis of symmetry of the housing. The housing has four openings which are provided with flanges and which have the same diameter and centers located on one of the first and second axes, and are arranged at the same distance from the intersection point of the first and second axes.

10 Claims, 5 Drawing Sheets

DISCONNECTOR FOR A METAL ENCAPSULATED, GAS INSULATED HIGH VOLTAGE SWITCHGEAR

BACKGROUND OF THE INVENTION

1. Field of the Invention

The invention is based on a disconnector for a metal encapsulated, gas insulated high voltage switchgear.

2. Discussion of Background

The invention refers to a prior art such as is disclosed for example in the Offenlegungsschrift DE-A1-42 10 545. In this publication a right-angle disconnector for a metal encapsulated, gas insulated high voltage switchgear is described, having two switching elements which are arranged in the metal encapsulation which is filled with insulating gas and can be brought into contact with one another or disconnected from one another along an axis and which each have a pin-shaped, axially extending pre-arcing contact, which is constructed in one of the two switching elements as a follow-on contact, and a fixed contact which coaxially surrounds the pre-arcing contact of one of the two switching elements which is fixed and a moving contact which is provided on one of the two switching elements which is moving, which moving contact forms a permanent current path with the fixed contact in the switched-on position.

This disconnector has a comparatively large axial extent. By means of the follow-on contact, constructional elements which have a considerable extent in the axial direction and have to have high voltage shielding are included in the moving switching element. This leads to a considerable enlargement of the isolating geometry which is already determined to a substantial extent by the size of the open isolating distance.

The Offenlegungsschrift DE-A1-31 09 669 discloses a metal encapsulated, gas insulated disconnector which extends along a central axis. This disconnector has a housing which is equipped with a plurality of openings which have different diameters, are provided with flanges and are intended for the attachment of additional devices such as ground connections, voltage transformers, rupture disks, etc. These openings which are provided with flanges have axes which extend perpendicularly to the central axis. In addition to these openings, for the conduction of the current there are also the two openings which are provided with flanges. This housing has a comparatively large axial extent. This disconnector also has a comparatively large axial extent.

The Offenlegungsschrift DE-A1-43 20 906 discloses a metal encapsulated, gas insulated high voltage system which has a plurality of housings which are connected to one another in a pressure-tight manner and are of the same design but are mounted in different installation positions and equipped with different installation components. When these housings are mounted, it is necessary always to ensure that the correct installation components are mounted with respect to the installation position of the relevant housing. Each of these housings has four connection flanges which have three different diameters.

As a rule, three varieties of disconnector are used in metal encapsulated, gas insulated switchgear, namely:

a) linear disconnectors for disconnecting straight line elements such as for example for longitudinally disconnecting busbars or in straight parts of outgoing lines, b) outgoing disconnectors for separating off branches which lead for example from the busbar to loads, and c) right-angle disconnectors which are used when deflecting the current path, for example by an angle of 90°, for example as outgoing disconnectors. Such right-angle disconnectors can be used in particular where particularly little space is available for the sectioning point.

In conventional metal encapsulated, gas insulated switchgear a separate housing is provided for each of these disconnectors, these housings always being of different design from one another. The number of varieties of housing mounted in a system is increased by this, which makes production more expensive and stockholding more difficult.

SUMMARY OF THE INVENTION

Accordingly, one object of the invention is to provide a novel disconnector for a metal encapsulated, gas insulated, high voltage switchgear of the type mentioned at the beginning whose dimensions are comparatively small in the axial direction and in which all the varieties of disconnector can be installed in a housing which is of identical construction for each variety.

Particularly favorable high voltage systems are obtained if a housing of the same kind can be used for all the varieties of disconnector. In particular, the planning work is simplified if all the varieties can be realized with the same disconnector module.

Additionally, it proves particularly advantageous that the securing elements for the contact carriers of the disconnector can be composed of a comparatively small number of identical parts for all the varieties of disconnector. This, together with the uniform housing, results in a disconnector system which is very versatile and which nevertheless requires only a comparatively small number of parts to be held in stock.

Whatever the variety of disconnector, the dimensions of the finished disconnector are advantageously small in the axial direction, which is due to the fact that only part of the length of the isolating distance influences the axial extent of the disconnector. In the exemplary embodiments, the axial spatial requirement for half of the length of the isolating distance is eliminated by the bending at right angles of the securing elements for the contact carriers.

Further exemplary embodiments of the invention and the advantages which can be achieved with them are explained in greater detail below with reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
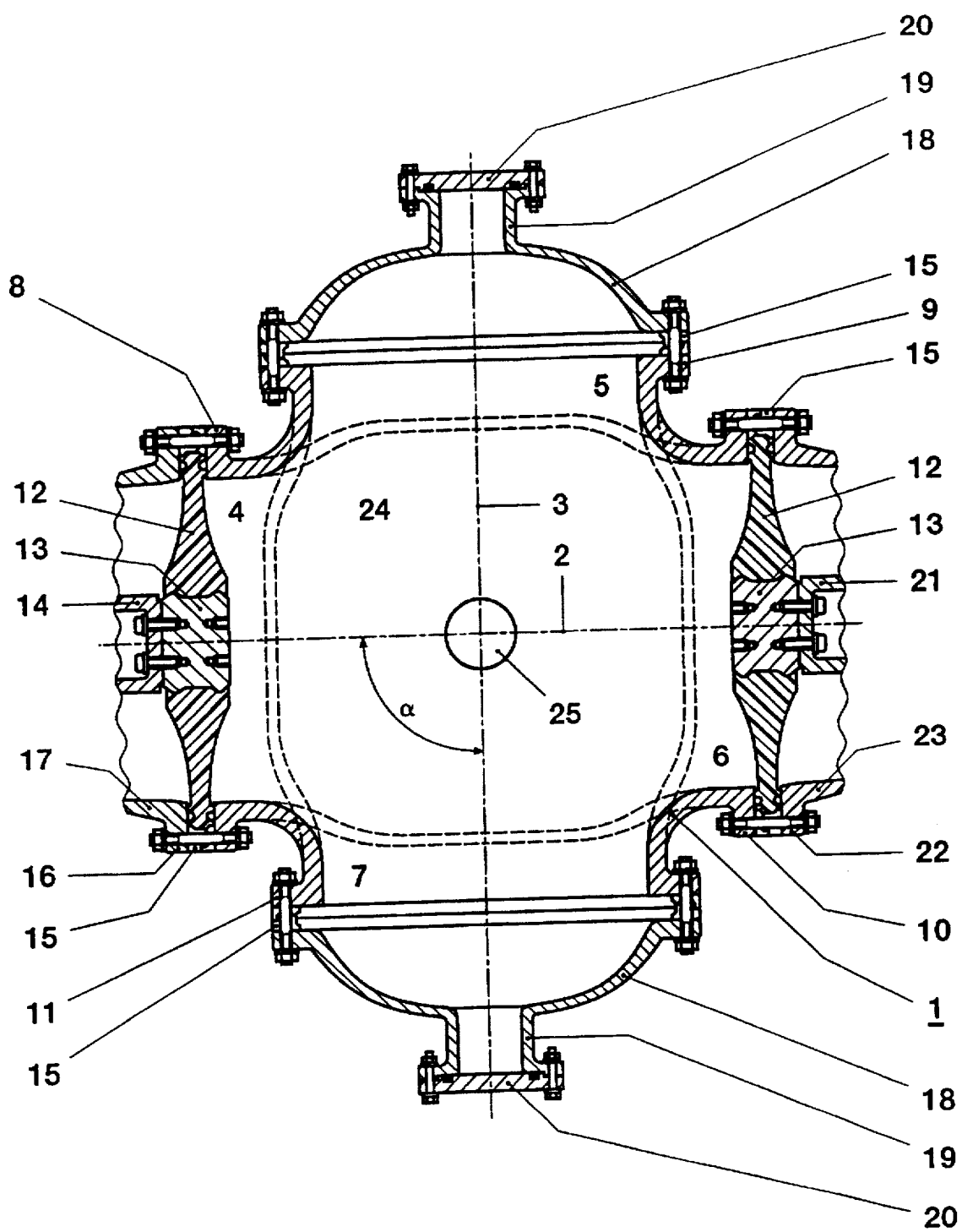
FIG. 1 shows a section through a housing of a disconnector according to the invention.

Referring now to the drawings, wherein like reference numerals designate identical or corresponding parts throughout the several views and in which all the elements which are not required for the direct comprehension of the invention are not illustrated, FIG. 1 shows a section through a schematically illustrated housing 1 of a disconnector according to the invention. The housing 1 is as a rule filled with an insulating gas under pressure, sulfur hexafluoride ($SF_6$) is particularly suitable for this. The visible edges of the housing 1 are only indicated for the sake of better clarity. This housing 1 is as a rule at ground potential in common with the other encapsulation parts of the gas insulated switchgear. The housing 1 has two axes 2, 3 which lie in a plane and which intersect at an angle $\alpha$. The angle $\alpha$ is as a rule constructed as a right angle but angles which deviate from a right angle are also conceivable for particular applications. As a rule, the housing 1 is cast from an aluminum alloy in a pressure-tight manner. The housing 1 has at least four circular openings 4, 5, 6 and 7 which are provided with flanges 8, 9, 10 and 11. Here, the flange 8 is assigned to the opening 4, the flange 9 to the opening 5, the flange 10 to the opening 6 and the flange 11 to the opening 7. The openings 4, 5, 6 and 7 are arranged in such a way that they are penetrated in the center by the axes 2, 3, specifically the axis 2 penetrates the openings 4 and 6 and the axis 3 penetrates the openings 5 and 7. The flanges 8, 9, 10 and 11 have faces which are arranged perpendicularly to the respective axes 2, 3.

The opening 4 is closed here by means of an insulator 12 which is constructed in a disk shape and has an electrically conductive embedded armature 13. The embedded armature 13 is screwed to a conductor 14. The insulator 12 is secured by means of an external ring 15 into which grooves are let for receiving sealing rings (not illustrated). The external ring 15 is composed of two metallic, electrically conductive rings of the same construction. The insulator 12 and the external ring 15 are secured in position by means of a connection flange 16, screwed to the flange 8, of an adjacent housing 17. The opening 5 is closed here by means of a cover flange 18. An external ring 15, which receives the necessary sealing rings (not illustrated), is mounted between the cover flange 18 and the flange 9. However, it is also possible to dispense with this external ring 15 and instead provide the supporting face of the cover flange 18 or the supporting face of the flange 9 with a groove for receiving a sealing ring. The cover flange 18 is provided with a connector 19 which is closed in a pressure-tight manner by means of a screwed cover 20. If appropriate, a rupture disk and also connections for the gas supply of the housing 1 can be installed in the cover flange 18 or in the cover 20.

The opening 6 is closed here by means of an insulator 12 which is constructed in a disk shape and has an electrically conductive embedded armature 13. The embedded armature 13 is screwed to a conductor 21. The insulator 12 is secured on the outside by means of an external ring 15 into which grooves are let for receiving sealing rings (not illustrated). The insulator 12 and the external ring 15 are secured in position by means of a connection flange 22, screwed to the flange 10, of an adjacent housing 23. The opening 7 is closed here by means of a cover flange 18. An external ring 15, which receives the necessary sealing rings (not illustrated), is mounted between the cover flange 18 and the flange 11. However, it is also possible to dispense with this external ring 15 and instead to provide the supporting face of the cover flange 18 or the supporting face of the flange 11 with a groove for receiving a sealing ring. The cover flange 18 is provided with a connector 19 which is closed in a pressure-tight manner by means of a screwed cover 20.

The housing 1 and the closure parts described above enclose an internal space 24 into which the active parts, supplied with high voltage, of the various varieties of disconnector can be installed. The covers 20 can be used for the installation of an extremely wide variety of accessories. The housing 1 can also be provided with additional connectors which can be used for the installation of sensors and viewing windows for visual monitoring of the disconnector position. In FIG. 1, a viewing window 25 is provided in the center of the housing 1, the viewing window 25 being installed in a connector which is of cylindrical construction and whose center axis runs perpendicularly to the plane in which the axes 2 and 3 lie and which additionally passes exactly through the point of intersection of the axes 2 and 3. A viewing window which is of identical construction is provided in the opposite wall of the housing 1 at exactly the same point. The sectioning point of all the varieties of disconnector is in each case arranged in the housing 1 at such a central location that it can be monitored through the viewing window 25 described above.

Figure 2:
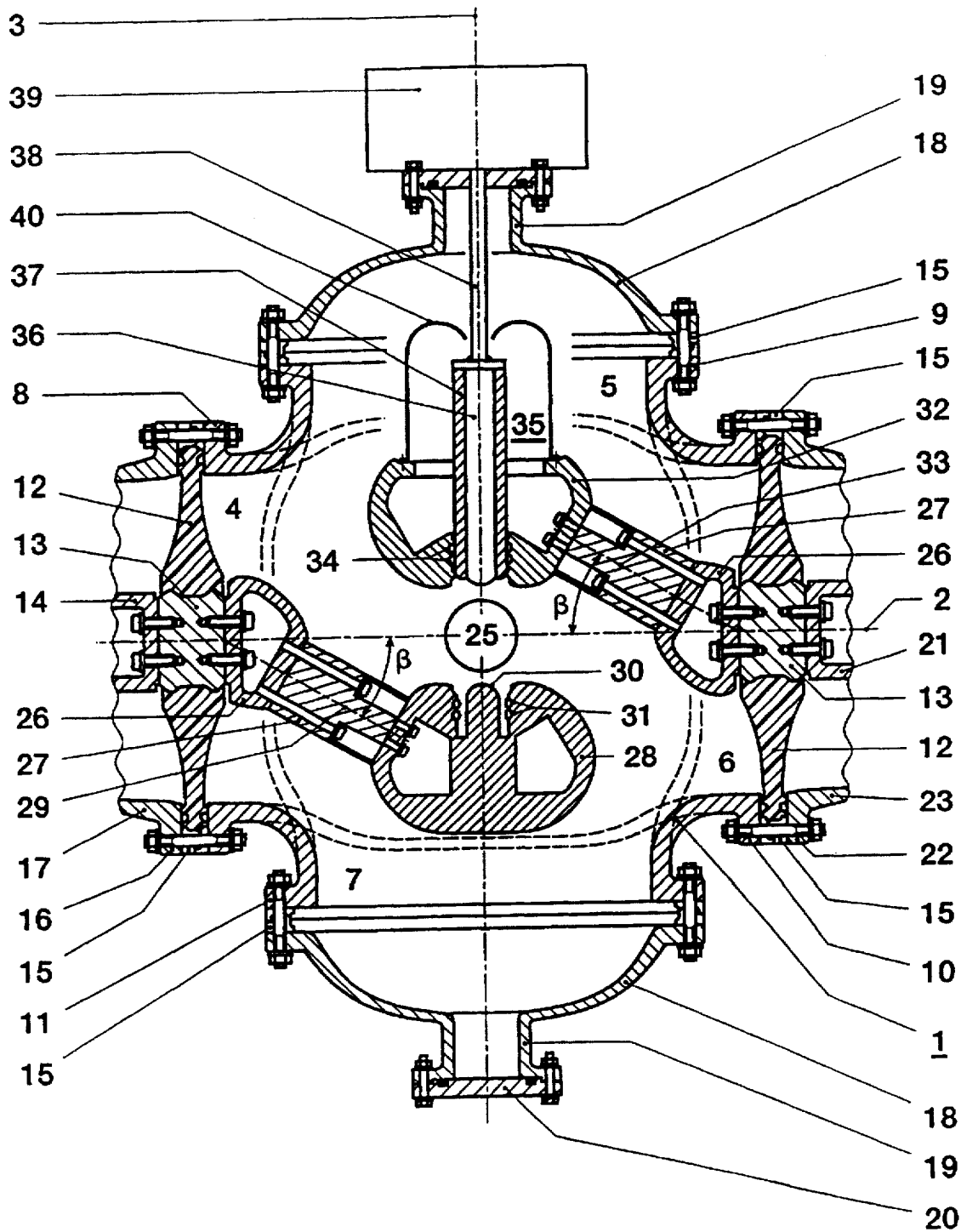
FIG. 2 shows a simplified section through a first embodiment of a disconnector according to the invention.

FIG. 2 shows a simplified section through a schematically illustrated first embodiment of a disconnector for metal encapsulated, gas insulated, high voltage switchgear in the switched-off state. This disconnector is constructed as a longitudinal disconnector such as is provided for example along the course of metal encapsulated, gas insulated busbars. The conductors 14 and 21 constitute here the respective ends of the busbar sections which are at high voltage potential. The conductor 14 is screwed to the metallic embedded armature 13 of the left-hand insulator 12. Connected to the side, facing away from the conductor 14, of the embedded armature 13 is an electrically conductive angled connection element 26 which is of favorable construction in terms of dielectrics and has a connection face which is inclined by an angle $\beta$ with respect to the axis 2. The angle $\beta$ has the value 30° here, but other values of the angle $\beta$ are also conceivable depending on the geometry of the housing 1, an angular range of 25° to 35° for this angle $\beta$ can, as a rule, be appropriately realized. The inclined connection face is screwed to an intermediate element 27 of cylindrical construction. The side, opposite the connection face, of the intermediate element 27 is screwed to a contact carrier 28. The intermediate element 27 extends along an axis 29 which lies in the same plane as the axes 2 and 3 and which is inclined by the angle $\beta$ with respect to the axis 2. The contact carrier 28 is of favorable construction in terms of dielectrics, it is produced from metal. A mating contact 30 which is of cylindrical construction and serves as a fixed pre-arcing electrode of the disconnector is let into the contact carrier 28. In addition, helical contacts 31 which assume the function of conducting current when the disconnector is closed are let into the contact carrier 28. The mating contact 30 extends in the direction of the axis 3 which at the same time forms the central axis of the mating contact 30.

The conductor 21 is screwed to the metallic embedded armature 13 of the right-hand insulator 12. An electrically conductive angled connection element 26 which is of favorable construction in terms of dielectrics and has a connection face which is inclined by an angle $\beta$ with respect to the axis 2 is connected to the side of the embedded armature 13 facing away from the conductor 21. It is ensured that these two angles $\beta$ always have the same value. Accordingly, this angle $\beta$ also has the value 30° here. The inclined connection face is screwed to an intermediate element 27 of cylindrical construction. The side, opposite the connection face, of the intermediate element 27 is screwed to a contact carrier 32. The intermediate element 27 extends along an axis 33 which lies in the same plane as the axes 2 and 3 and which is inclined by the angle $\beta$ with respect to the axis 2. The axis 33 runs parallel to the axis 29.

The contact carrier 32 is of favorable construction in terms of dielectrics, it is produced from metal. Helical contacts 34 for conducting the switchgear disconnector contact 35 is arranged in the center of the contact carrier 32. The moving disconnector contact 35 is of cylindrical construction, its axis coincides with the axis 3. The moving disconnector contact 35 has a contact pin 36 which is surrounded by a contact tube 37 of tubular construction. When the disconnector is switched on the contact tube 37 makes contact, after the contact pin 36, with the helical contacts 31 of the contact carrier 28 and when the disconnector is switched off the contact tube 37 separates first from the helical contacts 31 of the contact element 28 and only then does the contact pin 36 separate from the mating contact 30. An insulating rod 38 which is actuated by a drive 39 sets the moving disconnector contact 35 in motion. The drive 39 is attached to the upper connector 19. The insulating rod 38 extends out of the housing 1 in a pressure-tight manner. The insulating rod 38 is moved by means of a lever mechanism and as a rule a rotary transmission is used as pressure-tight bushing. The side of the moving disconnector contact 35 facing the drive 39 is covered using a shield 40 which is of favorable construction in terms of to dielectrics and is made of an electrically conductive material. The moving disconnector contact 35 extends along the axis 3 which at the same time forms the central axis of this contact. The helical contacts 34 enclose the contact tube 37 and connect it to the contact carrier 33 in an electrically conductive manner.

In the switched-on state of the disconnector the current flows from the conductor 14 into the conductor 21 through the embedded armature 13, the angled connection element 26, the intermediate element 27, the contact carrier 28, the helical contacts 31, the contact tube 37, the helical contacts 34, the contact carrier 32, the intermediate element 27, the angled connection element 26 and the embedded armature 13.

Figure 3:
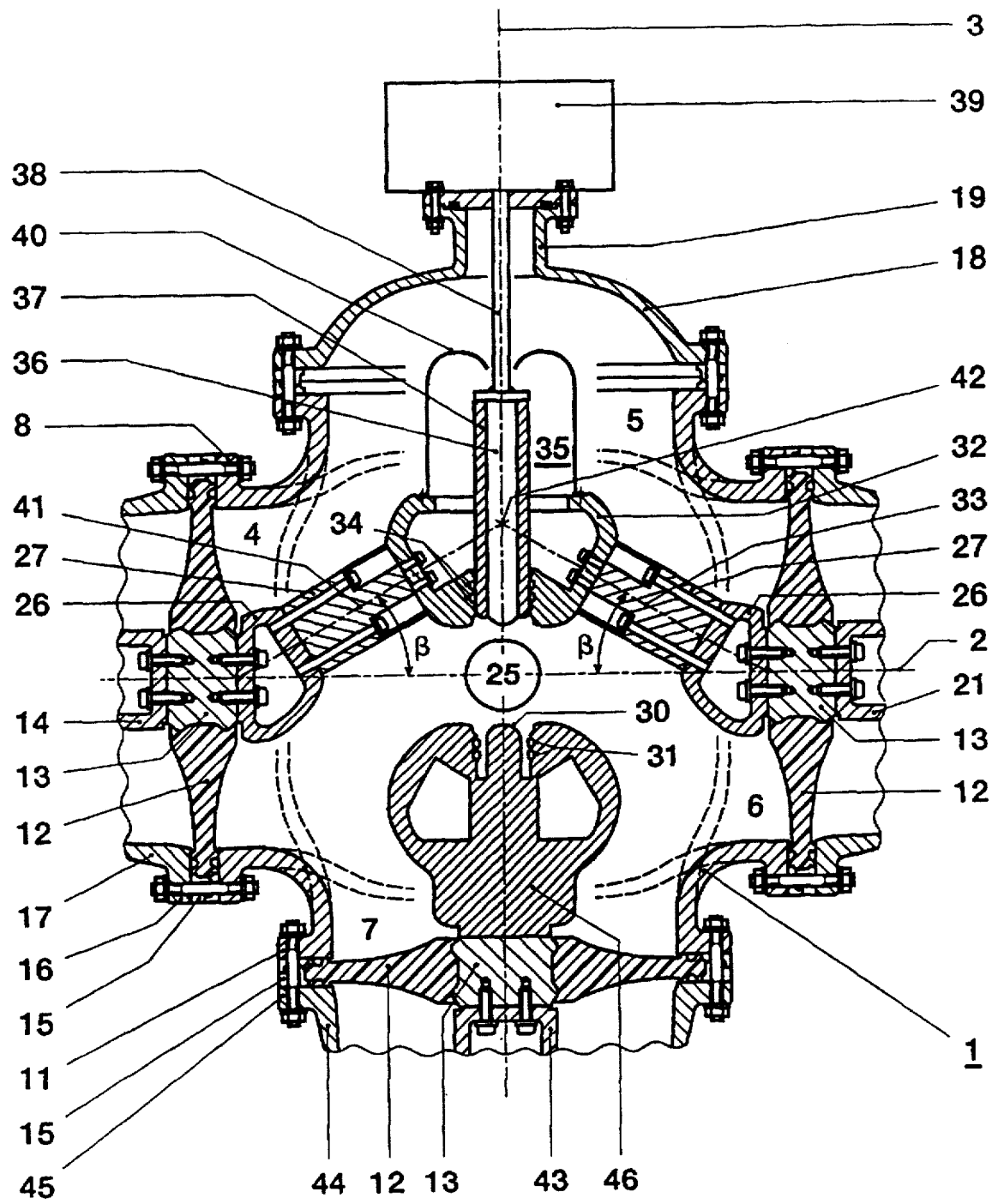
FIG. 3 shows a simplified section through a second embodiment of a disconnector according to the invention.

FIG. 3 shows a simplified section through a schematically illustrated second embodiment of a disconnector for metal encapsulated, gas insulated high voltage switchgear in the switched-off state. This disconnector is constructed as an outgoing disconnector such as is provided for example in metal encapsulated, gas insulated high voltage switchgear in order to connect an outgoing line or a feed line to the busbar or to disconnect it therefrom. The conductors 14 and 21 constitute here the respective ends of the busbar sections which are at high voltage potential, but here these two conductors 14 and 21 are connected to one another in an electrically conductive manner, as can be seen from FIG. 3. The conductor 14 is screwed to the metallic embedded armature 13 of the left-hand insulator 12. An electrically conductive angled connection element 26 which is of favorable construction in terms of dielectrics and has a connection face which is inclined by an angle β with respect to the axis 2 is connected to the side of the embedded armature 13 facing away from the conductor 14. The angle β has the value 30° here, but other values of the angle β are also conceivable depending on the geometry of the housing 1, an angular range of 25° to 35° for this angle β can, as a rule, be appropriately realized. The inclined connection face is screwed to an intermediate element 27 of cylindrical construction. The side, opposite the connection face, of the intermediate element 27 is screwed to a contact carrier 32. The intermediate element 27 extends along an axis 41 which lies in the same plane as the axes 2 and 3 and which is inclined by the angle β with respect to the axis 2.

The contact carrier 32 is of favorable construction in terms of dielectrics, it is produced from metal. The contact carrier 32 bears, as already described earlier, the disconnector contact 35 which can move along the axis 3. The contact carrier 32 is connected to the conductor 21 by means of a further intermediate element 27 which extends along an axis 33, a further angled connection element 26 and an embedded armature 13, as has already been described in connection with FIG. 2. The axis 33 intersects the axis 2 at an angle β. The two axes 41 and 33 intersect at an intersection point 42 lying on the axis 3 in the region of the moving disconnector contact 35. At least one of the two intermediate elements 27 is however provided with a compensation device (not illustrated) which can compensate mechanical tolerances during the mounting of the disconnector and thermal expansions when the disconnector is in operation, which thermal expansions act along the axes 41 and 33 so that the load-bearing insulators 12 cannot be overloaded by mechanical stresses.

A conductor 43 constitutes the active part of the outgoing line or of the feed line. The conductor 43 is protected against environmental influences by a connection housing 44 which is filled with insulating gas under pressure. The opening 7 of the housing 1 is closed here by means of an insulator 12 which is constructed in a disk shape and has an electrically conductive embedded armature 13. The embedded armature 13 is screwed to the conductor 43. The insulator 12 is secured by means of an external ring 15 into which grooves are let for receiving sealing rings (not illustrated). The external ring 15 is composed of two metallic electrically conductive rings which are of identical construction. The insulator 12 and the external ring 15 are secured in position by means of a connection flange 45, screwed to the flange 11, of the connection housing 44. A cylindrical contact carrier 46, which is of favorable construction in terms of dielectrics and into which a mating contact 30 and helical contacts 31 are let, in a manner similar to that of the contact carrier 28 in FIG. 2, is screwed to the side, opposite the conductor 43, of the embedded armature 13. The contact carrier 46, the embedded armature 13 and the conductor 43 have a common center axis which is congruent with the axis 3.

Figure 4:
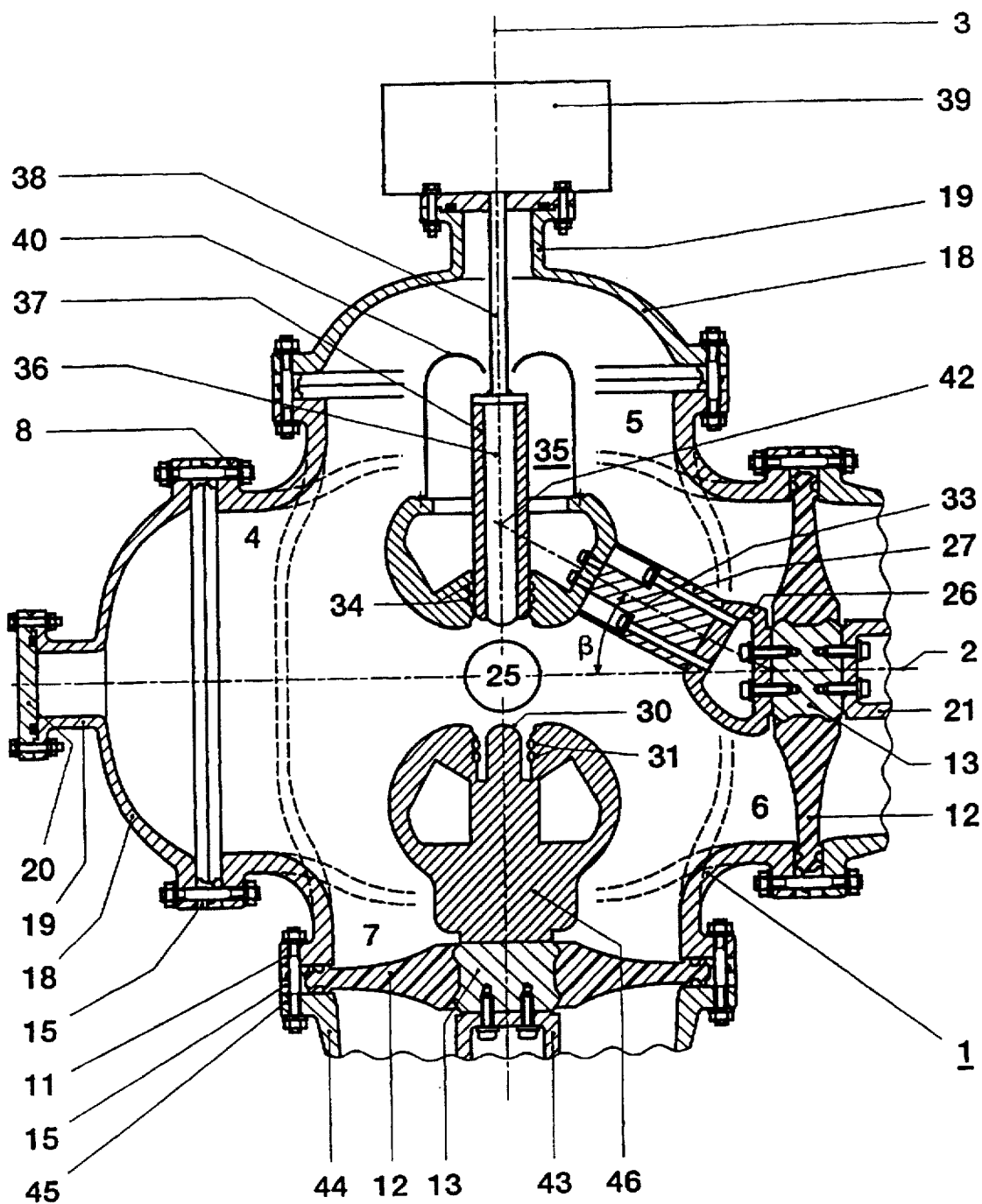
FIG. 4 shows a simplified section through a third embodiment of a disconnector according to the invention.

FIG. 4 shows a simplified section through a schematically illustrated third embodiment of a disconnector for metal encapsulated, gas insulated high voltage switchgear in the switched-off state. This disconnector is constructed as a right-angle disconnector such as is provided for example in metal-encapsulated, gas insulated high voltage switchgear in order to provide particularly space-saving disconnectable connection possibilities. The conductors 43 and 21 constitute here the respective ends, to be connected or disconnected as required, of the parts of the system which are at high voltage potential. The connection of the conductor 21 to the moving disconnector contact 35 is realized in the same way as is described in FIG. 2. Here also, the intermediate element 27 is inclined by an angle β with respect to the axis 2. The angle β has the value 30° here, but other values of the angle β are also conceivable depending on the geometry of the housing 1, an angular range of 25° to 35° for this angle β can, as a rule, be appropriately realized. The intermediate element 27 extends along an axis 33 which lies in the same plane as the axes 2 and 3 and which is inclined by the angle β with respect to the axis 2. The contact carrier 32 is of favorable construction in terms of dielectrics, it is produced from metal. The contact carrier 32 bears, as already described earlier, the disconnector contact 35 which can move along the axis 3.

The axis 33 intersects the axis 3 at an intersection point 42 located in the region of the moving disconnector contact 35.

A conductor 43 constitutes the active part of the outgoing line or of the feed line. The conductor 43 is protected against environmental influences by a connection housing 44 which is filled with insulating gas under pressure. The opening 7 of the housing 1 is closed here by means of an insulator 12 which is constructed in a disk shape and has an electrically conductive embedded armature 13. The embedded armature 13 is screwed to the conductor 43. The insulator 12 is secured by means of an external ring 15 into which grooves are let for receiving sealing rings (not illustrated). The external ring 15 is composed of two metallic electrically conductive rings which are of identical construction. The insulator 12 and the external ring 15 are secured in position by means of a connection flange 45, screwed to the flange 11, of the connection housing 44. A cylindrical contact carrier 46, which is of favorable construction in terms of dielectrics and into which a mating contact 30 and helical contacts 31 are let, similarly to the case of the contact carrier 28 in FIG. 2, is screwed to the side, opposite the conductor 43, of the embedded armature 13. The contact carrier 46, the embedded armature 13 and the conductor 43 have a common center axis which is congruent with the axis 3.

Figure 5:
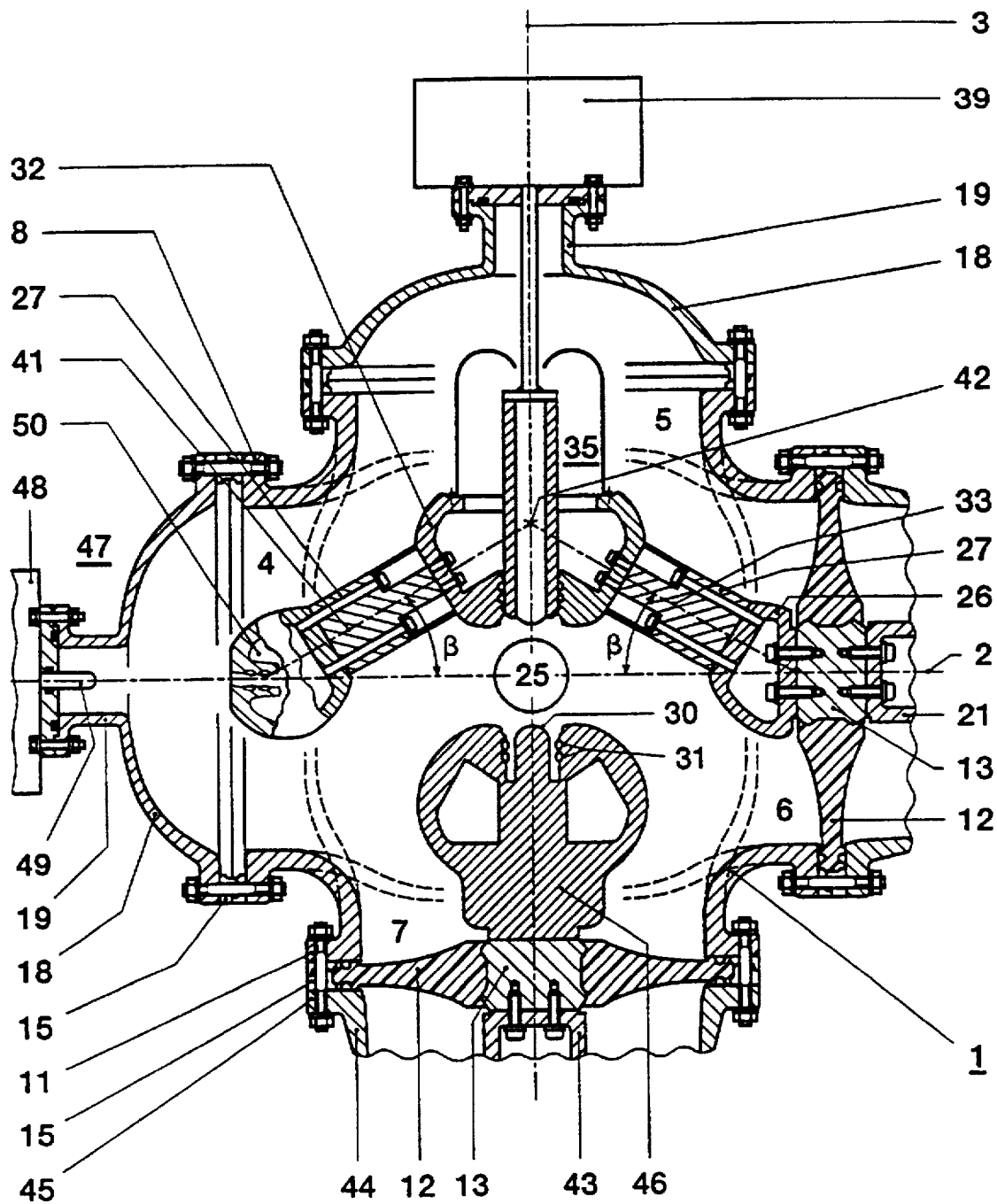
FIG. 5 shows a simplified section through a further embodiment of the disconnector according to the invention in accordance with FIG. 4.

FIG. 5 shows a modified embodiment of the disconnector according to FIG. 4, specifically this disconnector is additionally equipped with a ground connection 47. The ground connection 47 has a schematically illustrated drive 48 which moves a contact pin 49 (illustrated in the switched-off position) along the axis 2 in the direction of a fixed mating contact 50. A contact arrangement (not illustrated) which receives the contact pin 49 is let into the mating contact 50. The mating contact 50 is screwed to an intermediate element 27 which is connected to the contact carrier 32 in an electrically conductive manner. This intermediate element 27 extends along an axis 41 which lies in the same plane as the axes 2 and 3 and which is inclined by the angle β with respect to the axis 2. The two axes 41 and 33 intersect at an intersection point 42 lying on the axis 3 in the region of the moving disconnector contact 35. However, the two intermediate elements 27 here do not need to be provided with a compensation device for production tolerances and thermal expansions.

When the disconnector is opened, if operating reasons require it, the side of the disconnector which is connected to the conductor 21 can be grounded. However, it is also possible to modify the contact carrier 46 in such a way that the intermediate element 27 and the mating contact 50 connected thereto can be attached to it so that instead of the side connected to the conductor 21 the side of the disconnector connected to the conductor 43 can now be grounded if required. If there is no space for the installation of a ground connection in the housing 1, the grounding equipment necessary for proper inspections of the metal encapsulated, gas insulated switchgear is accommodated in housings adjacent to the respective disconnector.

Basically, the varieties of disconnector for high voltage switchgear shown in FIGS. 1 to 5 can be installed in any desired installation position which is prescribed by the system concept of the respective metal encapsulated, gas insulated switchgear. The various varieties of disconnector can be constructionally implemented using a small number of identical components in a kit-like manner in the same housing 1 for all the varieties. The costs of stockkeeping can be kept advantageously low because of the comparatively low number of identical parts. It is particularly advantageous that only a single type of housing, namely the housing 1, is required for all varieties of disconnector required in a metal encapsulated, gas insulated high voltage switchgear.

The covers 20, such as are provided in FIGS. 2 and 4 for closing the connectors 19, can advantageously be replaced by rupture disks if the insulators 12 are realized as pressure-tight partition insulators. If the insulators 12 are provided with passages which permit gas to be exchanged with adjacent housings, the rupture disks can also be provided in the adjacent housings. However, the cover 20 in FIG. 2 can also be equipped with a ground connection but the contact carrier 28 must then be provided with a means of making contact with the contact pin of this ground connection, the means being of favorable construction in terms of dielectrics.

When the disconnector is switched on, the moving disconnector contact 35 is moved along the axis 3 onto the fixed mating contact 30 by means of the insulating rod 38 which is activated by the drive 39. Pre-arcing between the moving contact arrangement 35 and the fixed mating contact 30 which may have been brought about by residual charges and/or by a voltage of operating frequency present between the contact carrier 32 and the contact carrier 28 and 46 is satisfactorily overcome by each of the varieties of disconnector. Owing to the geometric arrangement of the active disconnector parts, it is not possible to widen the pre-arc toward the wall of the housing 1. The drive 39 of the disconnector is configured in such a way that it moves the moving contact arrangement 35 reliably into the switched-on position provided in every possible operating case so that it is always ensured that current will be conducted satisfactorily via the contact tube 37 provided for this and the helical contacts 31 and 34. Likewise, the opening of the disconnector also takes place satisfactorily.

The aforementioned ground connections can also be activated in a position-independent manner so that there are no positional installation restrictions in this respect either. These ground connections can be constructed either as work-in-progress ground connections or as high-speed ground connections. The disconnector assembly is of very compact design and takes up a particularly small amount of space in the axial direction so that the switching matrix provided with these disconnectors can be realized with particularly small dimensions.

Bends in the current path of the gas insulated switchgear result in high electrodynamic forces occurring in the current path at these points when high fault currents occur, in particular surge short-circuit currents. The varieties of disconnector according to FIG. 2 and FIG. 3 are of electrodynamically favorable construction such that these electrodynamic forces are compensated at least partially so that the bending moments acting on the load-bearing insulators can be kept comparatively small and the insulators 12 which bear the active disconnector parts can therefore absorb these moments without additional reinforcement.

The housing 1 is illustrated in FIGS. 1 to 5 as a symmetrically constructed housing. However, if the system concept of the high voltage system should require, for example for the additional installation of ground connections and rupture disks, that an additional housing of identical construction with corresponding flange openings should always be connected to the housing 1 using flanges, then this additional housing can be combined with the housing 1 to form a single-component cast part. If corresponding numbers are required, such a cast part which is then only symmetrical with one of the axes 2, 3 provides economic advantages since a complex flange connection can be eliminated. The advantages of the symmetrically constructed housing 1, described above, with regard to the possibilities of disconnector installation are of course also retained even if this housing 1 is completely integrated into the additional housing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A disconnector for a metal encapsulated, gas insulated high voltage switchgear, comprising:
   a housing, the housing having at least two axes which intersect at a first angle, the first angle being a right angle;
   a first contact carrier and a second contact carrier, the first and second contact carriers being arranged on a first axis of the at least two axis and being positioned relative to each other, by securing elements, at an isolating distance; and
   a disconnector contact, the disconnector contact being movable along the first axis, the disconnector contact being guided by the first contact carrier and, in a switched-on state of the disconnector contact, bridges the isolating distance between the first and second contact carriers in an electrically conductive manner,
   wherein the first axis and a second axis of the at least two axes each form an axis of symmetry of the housing, and the housing has at least four openings, the openings being provided with flanges and having a same diameter, centers of the openings being located on one of the first axis and the second axis, the openings each being disposed at a same distance from an intersection point of the first axis and the second axis, the intersection point being located in a center between the first and second contact carriers, at least two of the openings being provided on each of the first axis and the second axis, and the securing elements include a
      first securing element for the first contact carrier, the first securing element having a third axis, the third axis being inclined at a second angle with respect to the second axis,
      a second securing element for the second contact carrier, the second securing element having a fourth axis, the fourth axis being inclined at the second angle with respect to the second axis, and
      the third axis and the fourth axis are parallel to each other and are disposed in a plane with the first axis and the second axis.

2. The disconnector as claimed in claim 1, wherein
   a further axis of symmetry extends through the intersection point of the first and second axes perpendicularly to the plane in which the first and second axes are disposed,
   the housing further including at least one viewing window at a point at which the further axis of symmetry penetrates a wall of the housing, the further axis of symmetry extending through a center of the at least one viewing window, the at least one viewing window being of cylindrical construction.

3. The disconnector as claimed in claim 1, wherein a length of the housing in the direction of the first axis is such that the housing is symmetrical only about the first axis.

4. A disconnector for a metal encapsulated, gas insulated high voltage switchgear, comprising:
   a housing, the housing having at least two axes which intersect at a first angle, the first angle being a right angle;
   a first contact carrier and a second contact carrier, the first and second contact carriers being disposed on a first axis of the at least two axes and being positioned relative to each other, by securing elements, at an isolating distance;
   a third contact carrier disposed opposite the first contact carrier on the first axis, and
   a disconnector contact, the disconnector contact being movable along the first axis, the disconnector contact being guided by the first contact carrier and, in a switched-on state of the disconnector contact, bridges the isolating distance between the first and second contact carriers in an electrically conductive manner,
   wherein the first axis and a second axis of the at least two axes each form an axis of symmetry of the housing, and the housing has at least four openings, the openings being provided with flanges and having a same diameter, centers of the openings being located on one of the first axis and the second axis, the openings each being disposed at a same distance from an intersection point of the first axis and the second axis, the intersection point being located in a center between the first and second contact carriers, at least two of the openings being provided on each of the first axis and the second axis, and the securing elements include a
      first securing element for the first contact carrier, the first securing element having a third axis, the third axis being inclined at a second angle with respect to the second axis,
      a second securing element provided for the first contact carrier, the second securing element having a fourth axis, the fourth axis being inclined at the second angle with respect to the second axis,
      the third axis and the fourth axis being disposed in a plane with the first axis and the second axis, the third axis and the fourth axis intersecting at an intersection point, the intersection point being disposed on the first axis.

5. The disconnector as claimed in claim 4, wherein a further axis of symmetry extends through the intersection point of the first and second axes perpendicularly to the plane in which the first and second axes are disposed, the housing further including at least one viewing window at a point at which the further axis of symmetry penetrates a wall of the housing, the further axis of symmetry extending through a center of the at least one viewing window, the at least one viewing window being of cylindrical construction.

6. The disconnector as claimed in claim 4, wherein a length of the housing in the direction of the first axis is such that the housing is symmetrical only about the first axis.

7. A disconnector for a metal encapsulated, gas insulated high voltage switchgear, comprising:
   a housing, the housing having at least two axes which intersect at a first angle, the first angle being a right angle;
   a first contact carrier and a second contact carrier, the first and second contact carriers being arranged on a first axis of the at least two axes and being positioned relative to each other, by securing elements, at an isolating distance; and
   a disconnector contact, the disconnector contact being movable along the first axis, the disconnector contact being guided by the first contact carrier and, in a switched-on state of the disconnector contact, bridges the isolating distance between the first and second contact carriers in an electrically conductive manner;

a third contact carrier disposed opposite the first contact carrier on the first axis, wherein the first axis and a second axis of the at least two axes each form an axis of symmetry of the housing, and the housing has at least four openings, the openings being provided with flanges and having a same diameter, centers of the openings being located on one of the first axis and the second axis, the openings each being disposed at a same distance from an intersection point of the first axis and the second axis, the intersection point being located in a center between the first and second contact carriers, at least two of the openings being provided on each of the first axis and the second axis, and the securing elements include a first securing element for the first contact carrier, the first securing element having a third axis, the third axis being inclined at a second angle with respect to the second axis and being disposed in a plane with the first axis and the second axis.

8. The disconnector as claimed in claim 7, further comprising a fixed mating contact of a ground connection and a third securing element, the third securing element connecting the first contact carrier to the fixed mating contact, the third securing element having a fourth axis, the fourth axis being inclined at the second angle with respect to the second axis, and the third axis and the fourth axis being disposed in a plane with the first axis and the second axis, the third axis and the fourth axis intersecting at an intersection point on the first axis.

9. The disconnector as claimed in claim 7, wherein a further axis of symmetry extends through the intersection point of the first and second axes perpendicularly to the plane in which the first and second axes are disposed, the housing further including at least one viewing window at a point at which the further axis of symmetry penetrates a wall of the housing, the further axis of symmetry extending through a center of the at least one viewing window, the at least one viewing window being of cylindrical construction.

10. The disconnector as claimed in claim 7, wherein a length of the housing in the direction of the first axis is such that the housing is symmetrical only about the first axis.

* * * * *